3,132,951
PLASTIC SHORTENING
Stuart W. Thompson, Allendale, N.J., assignor to Lever Brothers Company, New York, N.Y., a corporation of Maine
No Drawing. Filed Apr. 4, 1961, Ser. No. 100,513
5 Claims. (Cl. 99—118)

This invention relates to plastic shortenings and more particularly to plastic shortenings whose crystalline solids are predominantly in the beta phase.

Plastic shortenings of the conventional type are usually prepared by combining a major proportion of an unhydrogenated or partially hydrogenated oil called the base stock with a minor proportion of a substantially completely hydrogenated fat called the hard stock. The softening action of the base stock is balanced with the stiffening action of the hard stock to obtain a shortening having the desired consistency.

Plastic shortenings which are in the more stable beta crystalline phase when prepared are most desirable since they are not susceptible to variation in hardness, plasticity and other physical properties which generally accompany changes in crystalline structure. Furthermore, beta phase plastic shortenings exhibit superior cake making performances over conventional plastic shortenings when both types have been stored under conditions involving fluctuating temperatures. Pie crusts prepared with plastic shortenings containing solid ingredients predominantly in the beta crystalline phase are shorter and more tender than those pie crusts made with a conventional hydrogenated vegetable oil shortening.

For a definition of the beta phase and other polymorphic forms of fats and their determination by means of X-ray diffraction patterns, reference can be made to an article by E. S. Lutton in the Journal of the American Chemical Society, vol. 67, page 524 (1945).

U.S. Patent No. 2,801,177 discloses plastic shortenings containing a major proportion of a vegetable oil base stock of 80 to 95 iodine value and a minor proportion of a hard stock of iodine value less than 10, the crystalline solids of the shortening being predominantly in the beta phase. According to this patent, it is essential that the hard stock contain not less than 90% of fatty acids containing 18 carbon atoms in order to obtain a suitable product.

It is an object of this invention to prepare a beta phase shortening containing a hard stock having less than 90% $C_{18}$ fatty acids.

It is a further object of the invention to prepare a beta phase shortening from ingredients which are readily and inexpensively obtainable.

It is still another object of this invention to prepare a beta phase plastic shortening of exceptional quality and cake making performance.

These and other objects are fulfilled by preparing a plastic shortening containing a partially hydrogenated soybean oil base stock and a substantially completely hydrogenated hard stock derived from lard.

Although a fully hydrogenated lard contains less than about 75% of $C_{18}$ fatty acids, it is surprising that such a lard may be combined with a partially hydrogenated soybean oil base stock to produce a satisfactory plastic shortening. The source of the lard used to prepare the beta phase shortening is unimportant. However, the lard must be substantially completely hydrogenated to an iodine value of about 1 or less before it can be used in the compositions of the invention.

Furthermore, it has been found that the proportions of hydrogenated lard used as the hard stock must be within certain well-defined limits in order to obtain a beta phase shortening. The hydrogenated lard component must be within the range of about 10–12%, based on total weight of shortening. More than about 12% of the lard hard stock is undesirable because of the resulting high melting point of the shortening whereas amounts much less than about 10% do not form satisfactory beta phase shortenings.

The partially hydrogenated soybean oil used as the base stock may comprise the remainder of the shortening. Although the iodine value of the soybean oil may be varied within limits of about 80–95, the most favorable results have been obtained using a soybean oil of about 85 I.V., the latter representing the best compromise between keeping qualities and beta-forming properties of a shortening.

A suitable beta phase shortening may be prepared which contains about 10% to about 12% of 1 I.V. lard and 88% to 90% of 85 I.V. soybean oil. It is preferred, however, to include a minor proportion of a conventional shortening emulsifier in the shortening of this invention. The mono-diglyceride concentrates prepared from vegetable oils such as soybean or cottonseed oil have been found suitable.

The plastic shortenings are manufactured in the conventional manner by methods well known in the industry. Briefly, the method utilized involves melting the ingredients and pumping them through a refrigerated tube such as a Votator. The cooled shortening is then placed into containers, conditioned for three to four days at 90° F. and transferred to 70° F. for storage.

*Example 1*

Shortening blends were prepared containing 10% and 12% levels of 1 I.V. lard, 4.5% of mono-diglyceride concentrate prepared from 76 I.V. hydrogenated soybean oil and the balance in both cases being 85 I.V. hydrogenated soybean oil. Plastic shortenings were prepared from these blends in the conventional manner through a laboratory model Votator. A leading brand of a commercial beta-prime household shortening was melted and replasticized in a similar manner. The three shortenings were then conditioned for three to four days at 90° F. and transferred to 70° F. for storage. The X-ray diffraction patterns for the two shortenings containing hydrogenated lard as the hard stock showed only the characteristic beta crystalline phase lines whereas the X-ray patterns of the re-plasticized commercial shortening showed only the characteristic beta-prime crystalline phase lines.

Samples of all three shortenings were held at 70° F. while others were stored alternatively at −10° F. and 90° F. for three 4 day periods (three periods at each temperature), then stored for one week at 105° F. and returned to 70° F. The cycled samples and those held at 70° F. were then tested in a "one bowl" white layer cake recipe with the following results:

| Shortening | Treatment | Cake Volume, cc. |
|---|---|---|
| Beta phase, 10% lard stearine | Cycled | 1,185 |
| Do | Held at 70° F | 1,125 |
| Beta phase, 12% lard stearine | Cycled | 1,170 |
| Do | Held at 70° F | 1,125 |
| Beta-prime phase replasticized | Cycled | 1,110 |
| Do | Held at 70° F | 1,135 |

Surprisingly, the beta phase shortenings which were subjected to the cycling treatment gave larger cakes of excellent grain and texture. On the other hand, the commercial beta-prime phase shortening when subjected to the same cycling conditions gave smaller cakes whose grain and texture were considerably inferior. The interior of the cakes prepared with the commercial shortening contained numerous gas tunnels because the batter structure did not satisfactorily distribute and support the gas evolved by the baking powder.

This example shows the unexpected advantages obtained by the use of a shortening containing a partially hydrogenated soybean oil base stock and a fully hydrogenated lard hard stock where the crystalline solids of the plastic shortening are predominantly in the stable beta crystalline phase.

The "one-bowl" white layer cake test described in the above examples is as follows:

| Recipe | Grams | Volume Measurement |
| --- | --- | --- |
| Flour | 200 | 2 Cups. |
| Sugar-Fruit-Fine | 250 | 1¼ Cups. |
| Baking Powder—"Calumet" | 14 | 3½ Tsp. |
| Salt | 4 | 1 Tsp. |
| Shortening | 95 | ½ Cup. |
| Fresh Whole Milk | 210 | 1 Cup less 2 Tbsp. |
| Egg Whites (from shell eggs) | 90 | 3 Whites from 3 Eggs med. |
| Almond Flavor | 4 | 1 Tsp. |

*Machine method (Sunbeam Mixmaster).*—The flour, sugar, baking powder and salt are sifted into a mixing bowl and the shortening, flavor and two-thirds of the milk are thereupon added. After beating for 2 minutes at #4 speed, the bowl and beaters are scraped with a Spry spatula. After adding the egg white and remaining milk, beating is commenced for 2 minutes at #4 speed. The bowl and beaters are scraped as before and mixing is again continued for 2 minutes at #4 speed. The batter is divided between two paper-lined greased 8" layer cake tins and the cakes are baked for 22 minutes at 360° F.

Volumes are taken and cakes examined on the morning after they are baked.

It will be understood that the described embodiment of the invention is illustrative only and that modifications will occur to those skilled in the art. Therefore, the invention is not to be limited to the specific examples described herein, but is to be defined by the appended claims.

I claim:

1. A plastic shortening comprising about 10–12% by weight of a substantially completely hydrogenated lard hard stock and a partially hydrogenated soybean oil base stock having an iodine value of about 80–95, the crystalline solids of the shortening being predominantly in the beta phase.

2. The plastic shortening of claim 1 wherein the base stock has an iodine value of about 85 and the hard stock has an iodine value of about 1.

3. The plastic shortening of claim 1 containing an effective amount of a mono-diglyceride emulsifier.

4. A plastic shortening comprising: (a) about 10–12% by weight of a lard hard stock having an iodine value of about 1, (b) about 4.5% of a mono-diglyceride concentrate prepared from a partially hydrogenated vegetable oil, (c) about 83.5–85.5% of a soybean oil base stock having an iodine value of about 85, the crystalline solids of said shortening being predominantly in the beta phase.

5. The plastic shortening of claim 4 in which the mono-diglyceride concentrate is derived from hydrogenated soybean oil having an iodine value of about 76.

References Cited in the file of this patent
UNITED STATES PATENTS 2,201,692   Grettie _____ May 21, 1940
2,801,177   Lutton _____ July 30, 1957